United States Patent
Cai et al.

(10) Patent No.: US 7,844,456 B2
(45) Date of Patent: Nov. 30, 2010

(54) GRAMMAR CONFUSABILITY METRIC FOR SPEECH RECOGNITION

(75) Inventors: Qin Cai, Redmond, WA (US); John Hamaker, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 11/716,210

(22) Filed: Mar. 9, 2007

(65) Prior Publication Data
US 2008/0221896 A1 Sep. 11, 2008

(51) Int. Cl.
G10L 15/06 (2006.01)
G10L 19/14 (2006.01)
G10L 15/28 (2006.01)

(52) U.S. Cl. .......... 704/243; 704/205; 704/211; 704/255

(58) Field of Classification Search ............ None
See application file for complete search history.

(56) References Cited

U.S. PATENT DOCUMENTS

| | | |
|---|---|---|
| 4,972,485 A | 11/1990 | Dautrich et al. |
| 5,555,344 A | 9/1996 | Zunkler |
| 5,606,644 A | 2/1997 | Chou et al. |
| 5,737,723 A | 4/1998 | Riley et al. |
| 6,192,337 B1 | 2/2001 | Ittycheriah et al. |
| 6,487,532 B1 | 11/2002 | Schoofs et al. |
| 7,013,276 B2 | 3/2006 | Bickley et al. |
| 7,219,056 B2 * | 5/2007 | Axelrod et al. ........... 704/235 |
| 2002/0116196 A1 | 8/2002 | Tran |
| 2006/0064177 A1 | 3/2006 | Tian et al. |
| 2006/0195321 A1 | 8/2006 | Deligne et al. |
| 2007/0038454 A1* | 2/2007 | Eckhart et al. ........... 704/260 |
| 2007/0239455 A1* | 10/2007 | Groble et al. ........... 704/260 |
| 2008/0126089 A1* | 5/2008 | Printz et al. ........... 704/235 |

OTHER PUBLICATIONS

Printz et al., "Theory and Practice of Acoustic Confusability", Proceedings of the ISCA ITRW ASR2000, pp. 77-84, Sep. 18-20, 2000.*
Orenstein, "QuickStudy: Application Programming Interface (API)", Available at: http://www.computerworld.com/s/article/43487/Application_Programming_Interface, Jan. 10, 2000.*
"Speech Recognition: Handling Error Recognition and Repair", Date: 2002, http://www.ics.mq.edu.au/~stephenc/acl2005.pdf.

(Continued)

*Primary Examiner*—Brian L Albertalli

(57) ABSTRACT

Architecture for testing an application grammar for the presence of confusable terms. A grammar confusability metric (GCM) is generated for describing a likelihood that a reference term will be confused by the speech recognizer with another term phrase currently allowed by active grammar rules. The GCM is used to flag processing of two phrases in the grammar that have different semantic meaning, but that the speech recognizer could have difficulty distinguishing reliably. A built-in acoustic model is analyzed and feature vectors generated that are close to the acoustic properties of the input term. The feature vectors are then sent for recognition. A statistically random sampling method is applied to explore the acoustic properties of feature vectors of the input term phrase spatially and temporally. The feature vectors are perturbed in the neighborhood of the time domain and the Gaussian mixture model to which the feature vectors belong.

19 Claims, 10 Drawing Sheets

OTHER PUBLICATIONS

Chanod, et al., "Coupling an Automatic Dictation System with a Grammar Checker", Date: Aug. 1992, http://delivery.acm.org/10.1145/1000000/993103/p940-chanod.pdf?key1=993103&key2=0346328611&coll=GUIDE&dl=GUIDE&CFID=8517194&CFTOKEN=38518319.

Hazen, et al., "Recognition Confidence Scoring and Its Use in Speech Understanding Systems", Date: 2002, http://groups.csail.mit.edu/sls//publications/2002/Hazen_CSL02.pdf.

Willett, et al., "Confidence Measures for Hmm-Based Speech Recognition", http://www.mmk.ei.tum.de/~wafpubl/98/0525.pdf.

* cited by examiner

GRAMMAR CONFUSABILITY METRIC FOR SPEECH RECOGNITION

BACKGROUND

Advances in processing power and software execution are making speech recognition systems more desirable. Interactive voice response (IVR) systems are used extensively in telephone systems for guiding customers through a maze of options to obtain the desired information. Voice recognition systems are also being offered as a means for interacting with computer systems or system controlled by computers. Moreover, voice-controlled systems offer a way for physically handicapped users, for example, to benefit from computer technology by providing means for interacting through software programs that respond based on the quality of speech as converted and recognized by the underlying recognition system. However, widespread use of voice recognition systems that use audio input are underutilized due to reliability concerns.

As expected in speech recognition, it is unlikely that a word will be pronounced exactly the same way twice, so it is furthermore unlikely that the recognizer will find an exact match. Moreover, for any given segment of sound, there are many things the speaker could potentially be saying. The quality of a recognizer is determined by how good it is at refining its search, eliminating the poor matches, and selecting the more likely matches.

Voice recognition systems employ a list of words (or dictionary) that can be recognized by the recognizer engine. The grammar consists of a structured list of rules that identify words or phrases that can be used for speech recognition. These rules provide the guidelines that an application uses when collecting input terms or phrases voiced by a user. The possibilities of speech that can be recognized are limited by the size of the dictionary (or grammar) on which the recognizer depends.

Application grammar writing can be complex, time consuming and error-prone without help from editing tools. Moreover, the grammar editor should be alerted if there are terms or phrases with different semantic meaning in the grammar, but are easily confused by the speech recognition engine (e.g., "see" and "sea"). However, static methods using phone distance matrices are computationally more expensive and do not reveal the confusability metrics from the view of the speech recognition engine.

SUMMARY

The following presents a simplified summary in order to provide a basic understanding of some novel embodiments disclosed herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a way for testing a grammar for the presence of confusable terms for a speech recognizer. A grammar confusability metric (GCM) is generated for describing the likelihood that a reference term will be confused by the speech recognizer with another term phrase currently allowed by active grammar rules. One example involves receiving an input of "delete this voicemail", which could be confused with "repeat this voicemail". The GCM is used to flag the processing of two phrases in the grammar that have different semantic meaning, but that are so acoustically alike that the speech recognizer could have difficulty distinguishing reliably.

The built-in acoustic model is analyzed and feature vectors generated that are close to the acoustic properties of the input term. The feature vectors are perturbed spatially and/or temporally, and then sent directly to the speech recognizer or decoder for recognition to find the best matches for the activated grammar and rules as the recognition result, and use information from the matches to produce the GCM. Statistics from simulation runs are calculated to result in confusable scores that range from zero to one for acoustically confusable phrases given active grammars and rules.

A statistically random sampling method is applied to explore the acoustic properties of feature vectors of the input term or phrase spatially and/or temporally. The feature vectors are perturbed in the neighborhood of the time domain and the Gaussian mixture model to which the feature vectors belong.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
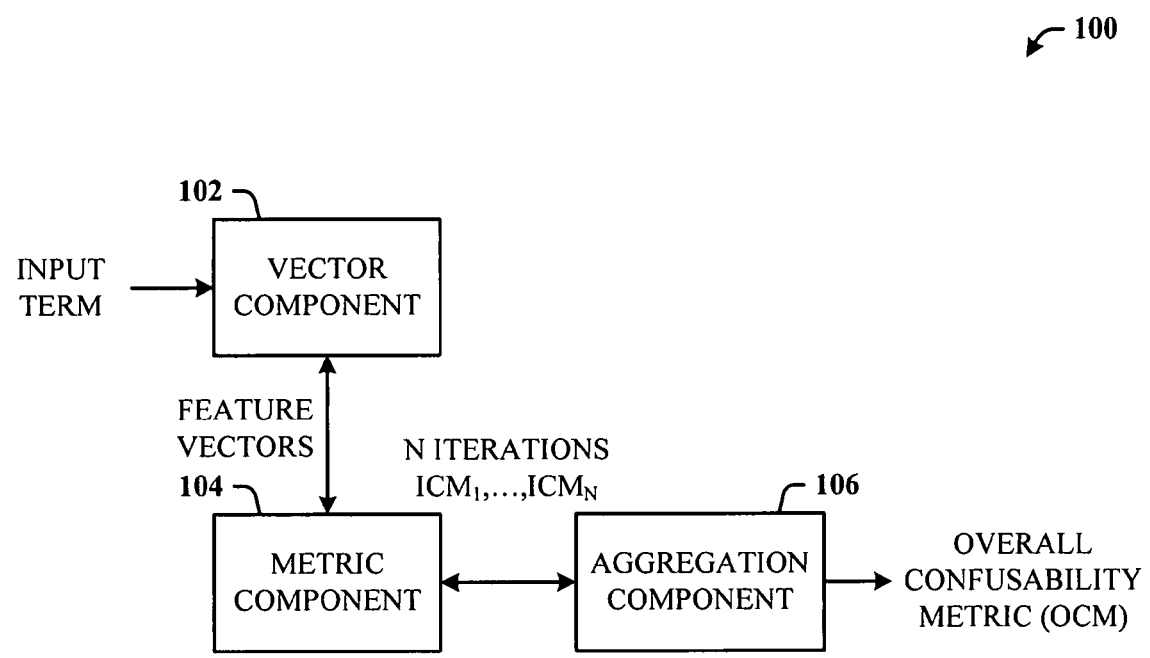
FIG. 1 illustrates a computer-implemented system that facilitates speech recognition.

Disclosed herein is architecture that makes direct use of the existing acoustic models and the speech recognition engine for computing a grammar confusion metric (GCM). Advantages over conventional static methods, such as computations using a phone confusion matrix, include providing a confusion score that reveals a measure of the speech recognition engine to differentiate acoustically similar phrases, and much simpler implementation. Moreover, the GCM it is language independent and the architecture can be deployed as a tool or part of a tool that alerts application developers to potential errors in or problems with the associated application grammars.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates speech recognition. The system 100 includes a vector component 102 for generating feature vectors that approximates acoustic properties of an input term or phrase. A metric component 104 receives and processes the feature vectors and outputs a confusability metric. The metric component 104 processes the feature vectors based on a number of iterations. In other words, for each iteration N (where N is a positive integer), an iteration confusability metric (ICM) (denoted $ICM_1, \ldots, ICM_N$) is generated and output from the metric component 104. The system 100 can also include an aggregation component 106 for aggregating the N ICMs to output an overall confusability metric (OCM) based on the iterative processing of the term. Although shown separately from the metric component 104, the aggregation component 106 can be part of the metric component 104. In an alternative embodiment, the aggregation component 106 can be part of the application.

It is to be appreciated that the system 100 can be employed for many different types of applications, including generally, for a need to determine a measure of confusion between at least two pieces of data. For example, image recognition, handwriting recognition, fingerprint recognition and facial recognition are just a few examples of other implementations. Moreover, the input is not limited to a single term, but can include strings of terms (or phrases). Additionally, the system 100 is language independent.

Feature vectors are related to the underlying acoustic model. The underlying model is a collection of phonemes that are modeled by, in one embodiment, a hidden Markov model. In an alternative embodiment, the phoneme space is modeled using a neural network.

Figure 2:
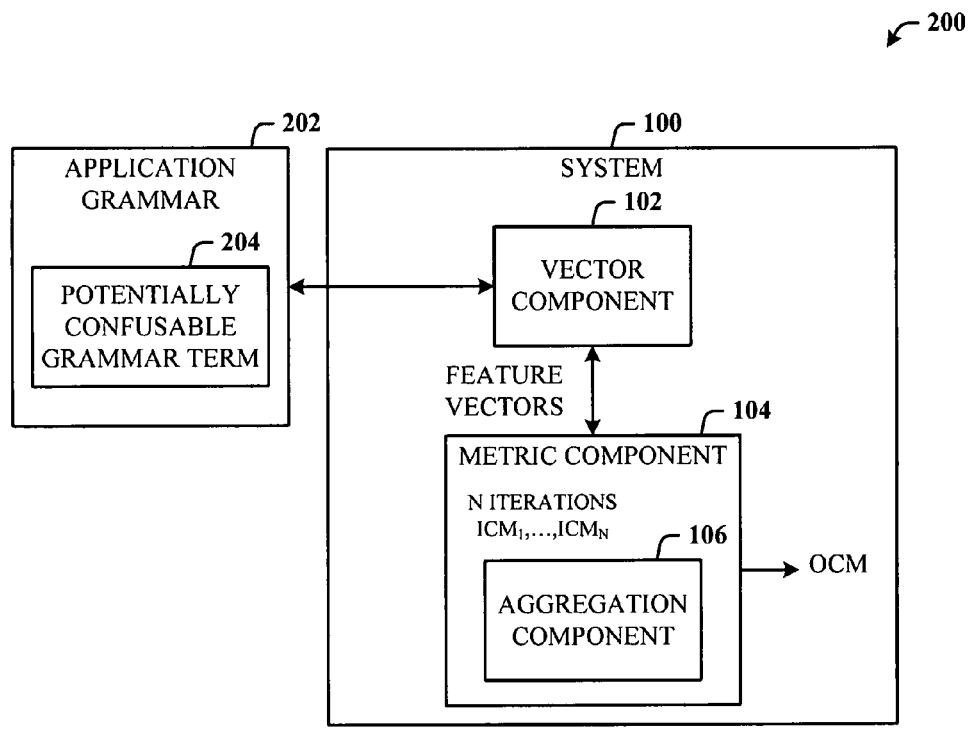
FIG. 2 illustrates a system that employs the system of FIG. 1 for testing confusability of terms in an application grammar.

FIG. 2 illustrates a system 200 that employs the system 100 of FIG. 1 for testing confusability of terms in an application grammar. Application grammars can be generated for many different types of deployments. For example, the grammar developed for a banking interactive voice response (IVR) system will be different than the grammar for an online purchasing system. Accordingly, the system 100 can process a particular grammar 202 for a potentially confusable grammar term(s) (or phrases) 204, and generate the OCM. The OCM can range from zero to one such that a value of 0.8 is more likely to be confusable than a term having an OCM value of 0.5. In other words, a term having an OCM of 1.0 is very likely to be confusable. Thus, the grammar developer can utilize this information to more carefully select terms for the grammar, or provide other means (e.g., prompting for user feedback) for handling excessively confusing terms or phrases that might not be avoidable. Note that here, the aggregation component 106 is illustrated as part of the metric component 104 for performing aggregation processes.

Figure 3:
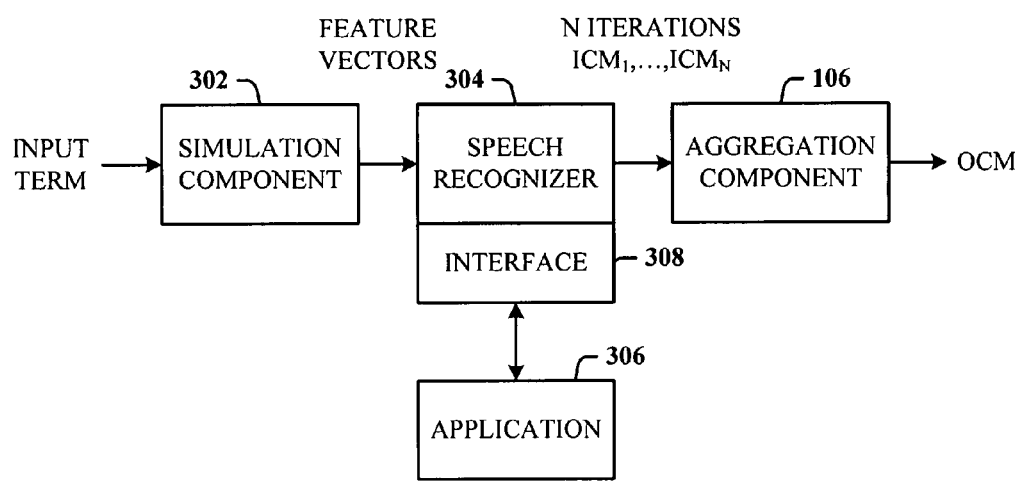
FIG. 3 illustrates a system that employs a simulation component for entering into a simulation mode for testing an input term for confusability.

FIG. 3 illustrates a system 300 that employs a simulation component 302 for entering into a simulation mode for testing an input term for confusability. The simulation component 302 is employed to control a speech recognizer 304 into the simulation mode for running iterations on the input term. The frontend sends the feature vectors to the decoder when the frontend thinks the input is sound rather than noise. In simulation mode, the frontend is bypassed and simulated feature vectors are generated and passed directly to the decoder. An application 306 interfaces to the recognizer 304 via a software interface 308.

In one implementation, an existing interface, referred to as ISpRecognizer2::EmulateRecognitionEx, can be utilized. In operation, results are generated with the similar acoustical properties as a real recognition. When simulated recognition has completed, an end simulation event is triggered by the interface 308 to notify the application 306 that the final simulation result, which is the OCM, can be retrieved.

Details for one implementation of the interface 308 and event handling are discussed as follows. The interface can be:
    HRESULT            EmulateRecognitionEx([in] ISpPhrase*pPhrase, [in] DWORD dwCompareFlag), where pPhrase is a reference phrase, and dwCompareFlag is used for string comparison such as ignoring case, width, and how to treat punctuation, etc.

A flag (SP_GRAMMAR_CONFUSION=0x10000000) can be added to indicate that the call is meant for generating grammar confusable phrases. The calling routine can set this flag in dwCompareFlag to enable the simulation functionality.

With respect to final recognition event handling, the recognizer 304 can send a recognition event (or trigger or notification) to a speech API (SAPI), for example, ISpSREngineSite, per recognition event. In one embodiment, many iterations can be executed using the recognizer engine 304 and events can be triggered for each iteration. In an alternative implementation, only a single notification is sent, which is after simulation recognition has completed, to initiate aggregation of the statistics for the final OCM results by the aggregation component 106.

In order to provide context for speech recognition as described herein, the recognizer can include a front-end component that receives and analyzes input sound waves as part of voicing a term (or phrase), and outputs to a decoder part of the engine, a continual stream of feature vectors which include probabilities that the sounds are speech rather than noise. The input sound is converted into multi-dimensional feature vectors in the frequency domain. The feature vectors are compared to a library of sounds via an acoustic model.

Following is a general description one exemplary means for speech recognition processing and GCM generation. A voiced term is received and processed into a phoneme, from a phoneme into senones, as an example only. Each senone represents a series of probabilities that a sound matches the output of the frontend. Thus, when one senone is compared to the input sound, the decoder knows how well the input sound matches the senone, and also includes probabilities for how well the input sound matches the senone as a whole.

As previously indicated, a sound is converted into multi-dimensional feature vectors. Each dimension can be converted into a real (or floating point) number. However, this is not a requirement, in that dimensions, alternatively, could be converted into integers, for example. Thus, a multi-dimension feature vector can have multiple floating-point numbers that are output for each processing frame. Rather than considering the numbers as a simply average and variance, the numbers can be processed as a statistical distribution of values. For example, a single Gaussian distribution can be used to model these values. However, by employing additional Gaussian distributions, better results can be obtained. Accordingly, a mixture of Gaussian distributions is utilized. Calculating the probability of a certain frontend feature vector dimension against a certain senone of a model is then by looking up the probability value on the graph. This is then multiplied by the number of dimensions and repeated for other senones considered.

If a large grammar was mapped out in terms of a tree of all possible senones that a user could utter, the tree would be prohibitively large. Thus, for each new word, a prefix tree can be created that provides a list of words that the user may say at a given point in a grammar tree. The words can be stored in the tree in terms of constituent senones. Each senone of the sequence is assigned a senone sequence ID. Thus, the tree includes tree nodes, where a single node is a senone sequence ID. The tree can be walked and candidate senones perturbed. The tree is an object that can be dynamically created and expanded as needed. The prefix tree is only one example of many ways in which input terms can be processed.

Figure 4:
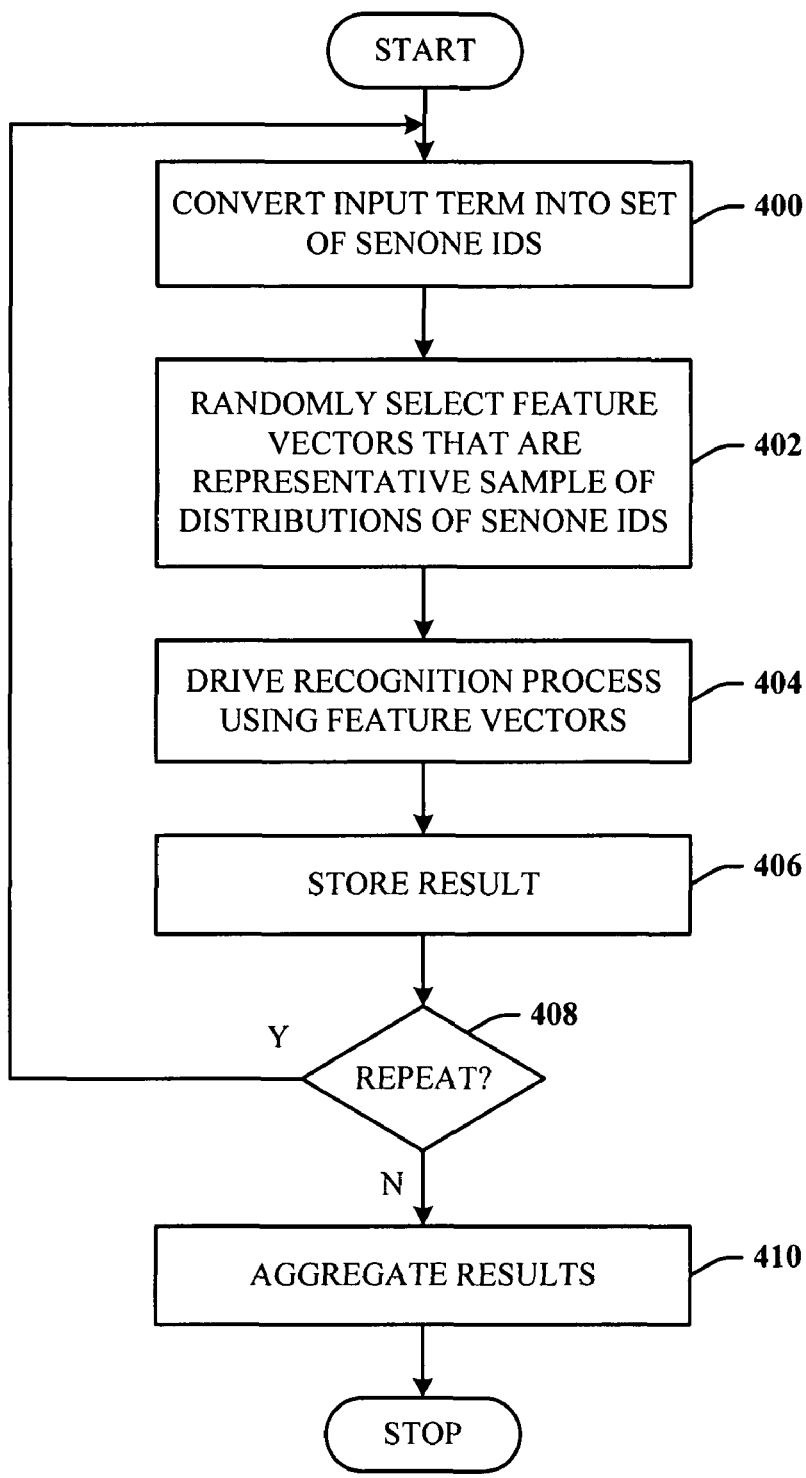
FIG. 4 illustrates a method of performing speech recognition for generating a confusability metric.

FIG. 4 illustrates a method of performing speech recognition for generating a confusability metric. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, an input term is converted by a frontend system into a set of senone IDs, where each senone is a feature vector. At 402, feature vectors are randomly selected that are a representative sample of distributions of the senone IDs. At 404, the recognition process is then driven using the feature vectors. At 406, a result is stored. At 408, the system checks to determine if the iteration process should be repeated. If yes, flow is back to 400 to redo the process using slightly different feature vectors. If the iteration process is over, flow is from 408 to 410 to retrieve the stored results and aggregate the results into an overall confusability metric.

Figure 5:
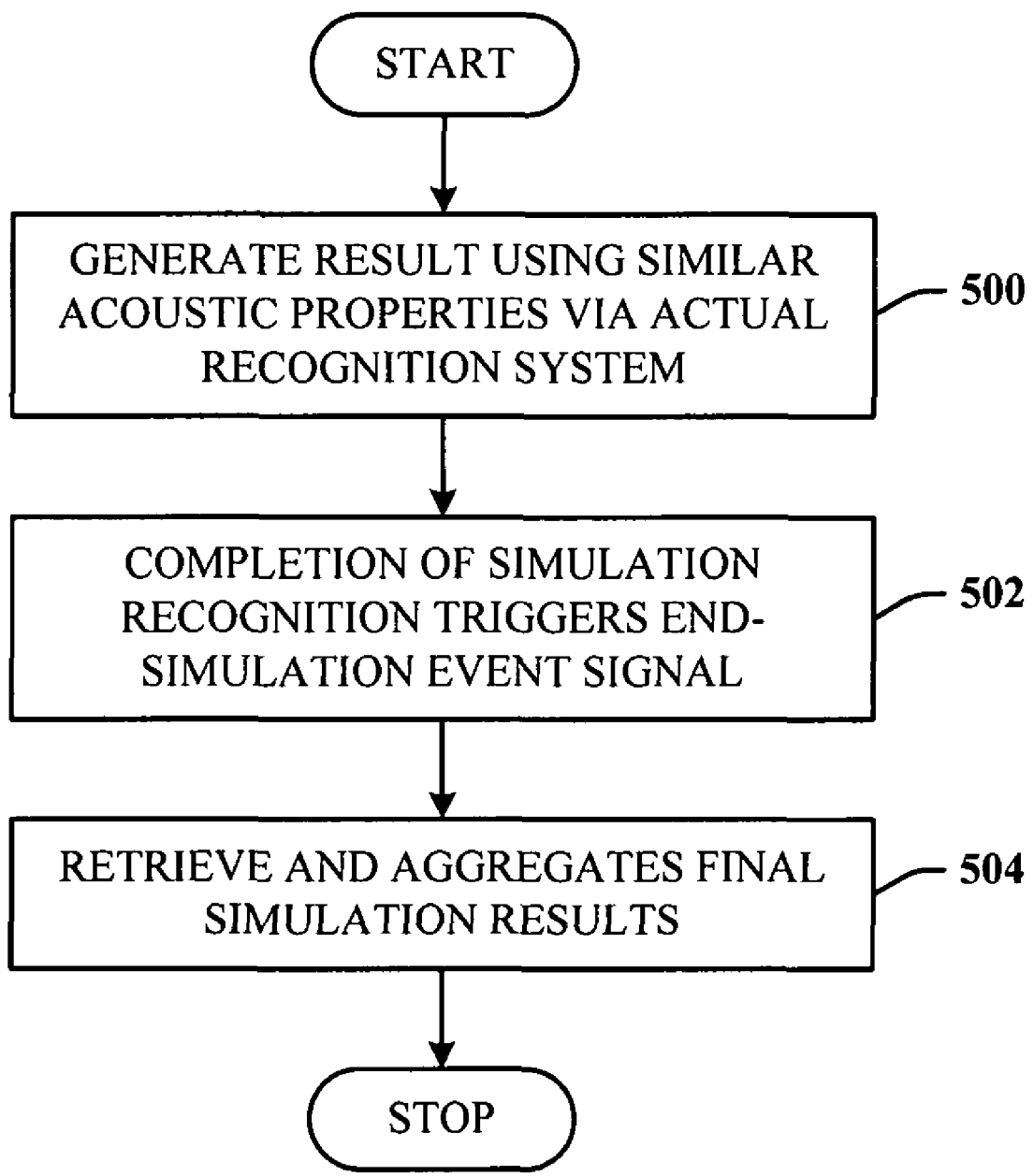
FIG. 5 illustrates a method of recognizing an uttered input term and outputting a confusability metric.

FIG. 5 illustrates a method of recognizing an uttered input term and outputting a confusability metric. At 500, a result is generated using similar acoustic properties via the actual recognition system. At 502, a simulation process is run and at the completion of the simulation process triggers an end-simulation event signal. At 504, the simulation results are retrieved and aggregated into a grammar confusability metric for that specific input term.

Figure 6:
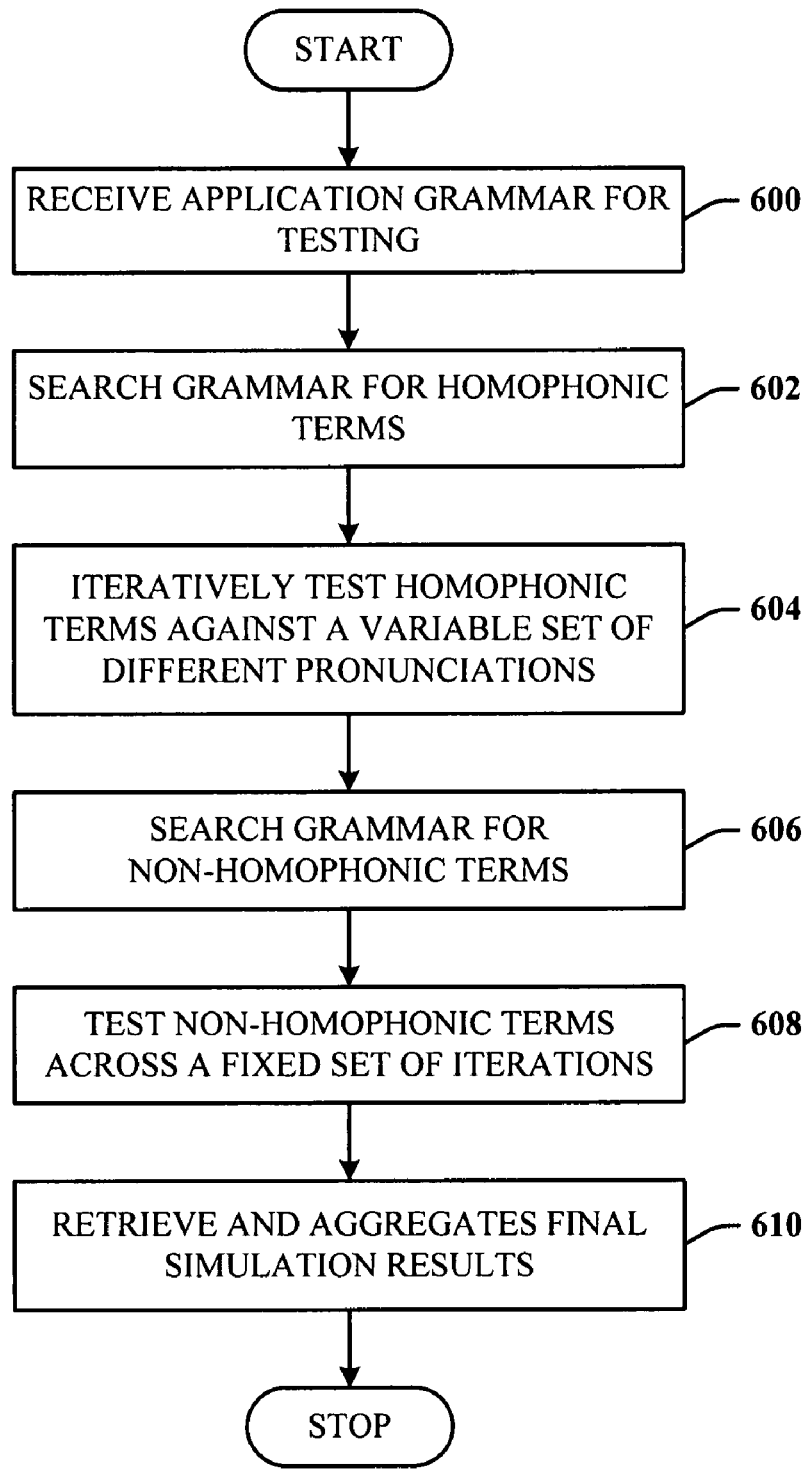
FIG. 6 illustrates an alternative method of recognition processing for an application grammar.

FIG. 6 illustrates an alternative method of recognition processing for an application grammar. At 600, an application grammar is received for processing. At 602, the grammar is searched for homophonic terms. At 604, a homophonic term is iteratively tested against a variable set of different pronunciations. At 606, the grammar is then searched for non-homophonic terms. At 608, the non-homophonic terms are tested using a fixed set of iterations. At 610, the simulation results are retrieved and aggregated into a final confusability metric.

Figure 7:
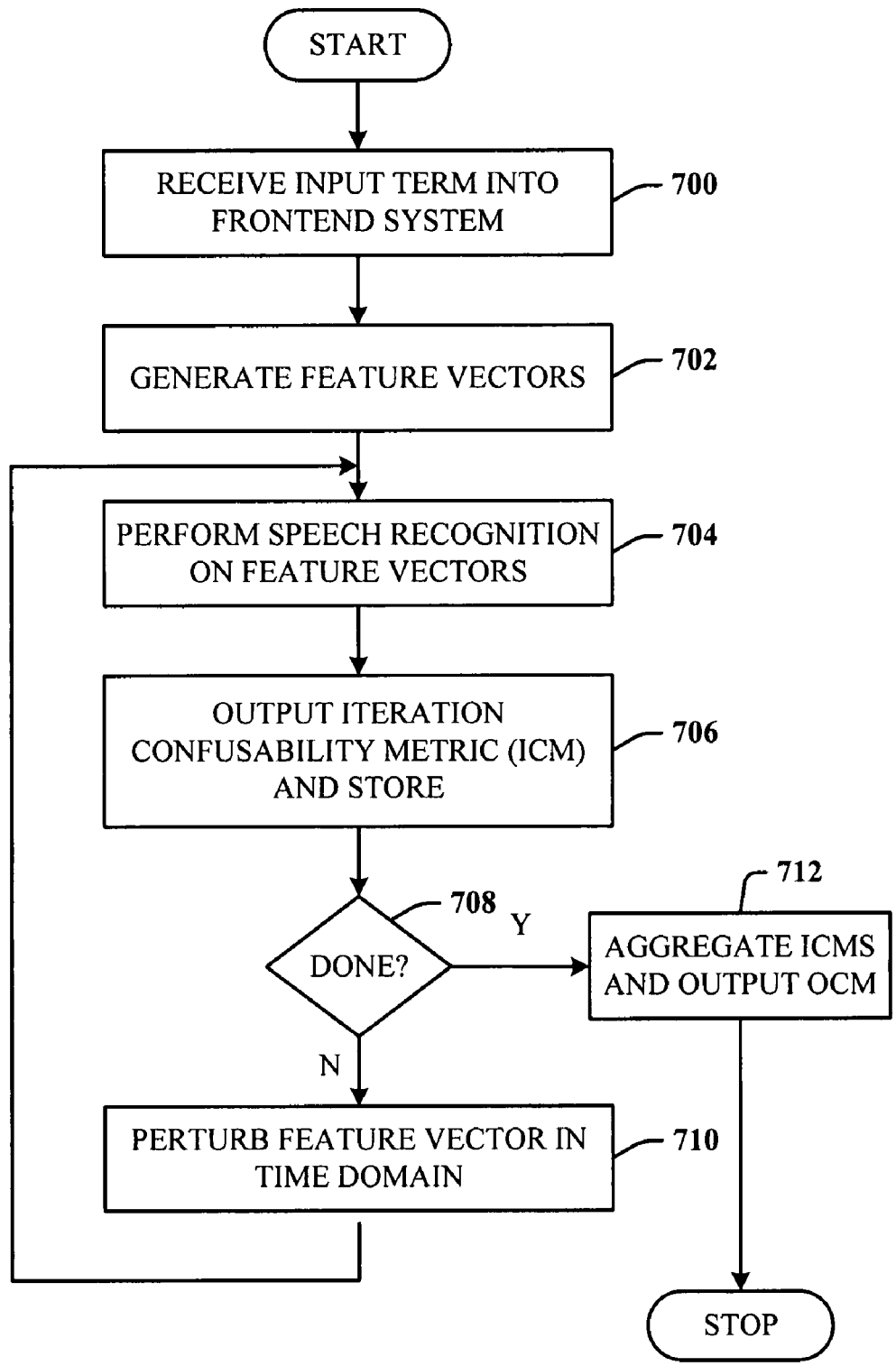
FIG. 7 illustrates a method of processing feature vectors in a time domain.

FIG. 7 illustrates a method of processing feature vectors in a time domain. At 700, an input term is received into a frontend system. At 702, the term is processed to output feature vectors. At 704, speech recognition is performed on the feature vectors. At 706, an iteration confusability metric is output for that particular iteration step. At 708, the system checks to determine if the iteration process is done. If not, flow is to 710 to perturb the feature vectors in the time domain. Flow is then back to 704 to process the perturbed vectors through the recognizer. Eventually, the iterative processing is done, and flow is from 708 to 712 to aggregate the iteration confusability metrics into the overall confusability metric, and output the overall confusability metric for other purposes.

Figure 8:
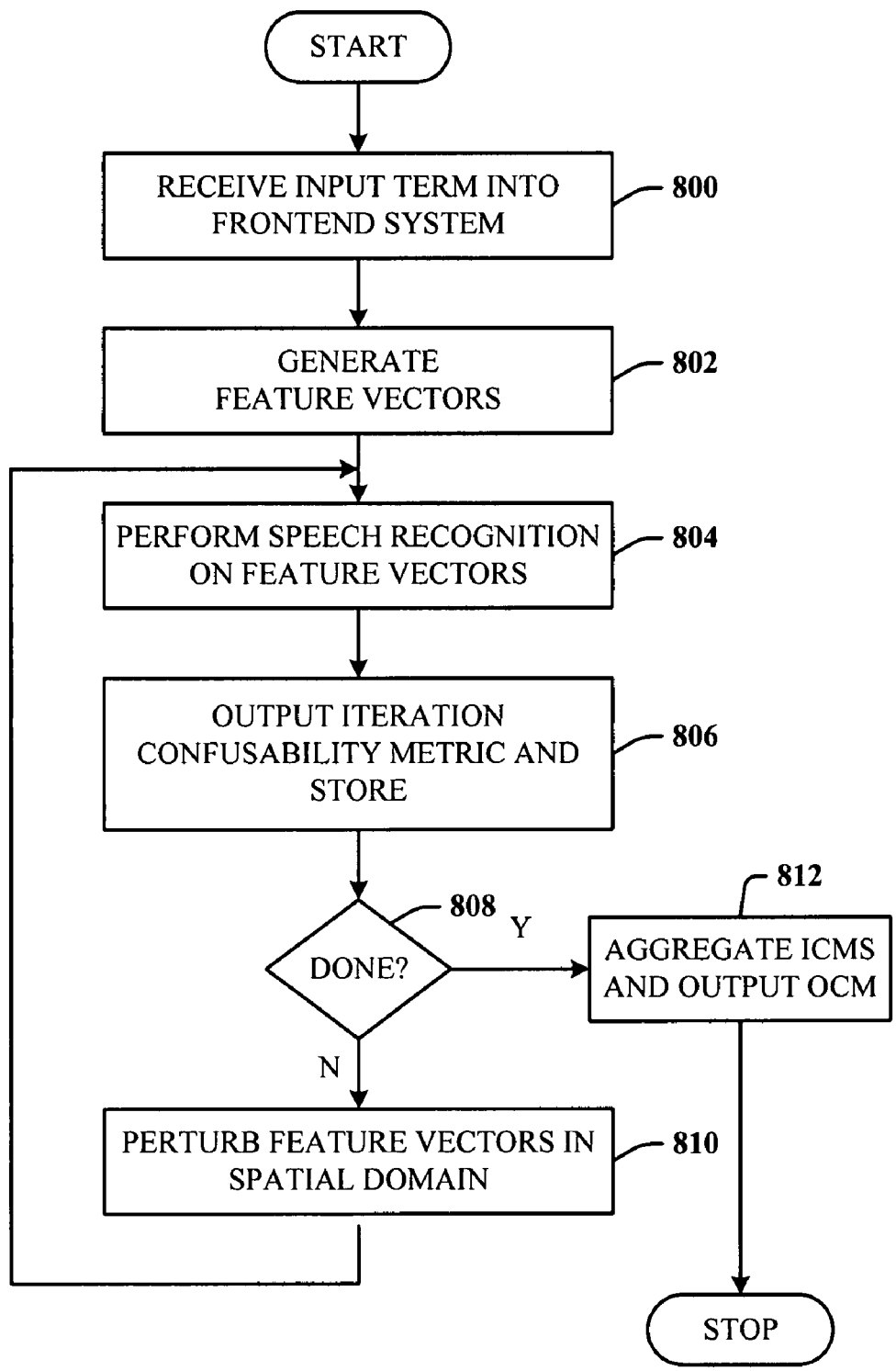
FIG. 8 illustrates a method of processing feature vectors in a spatial domain.

FIG. 8 illustrates a method of processing feature vectors in a spatial domain. At 800, an input term is received into a frontend system. At 802, the term is processed to output feature vectors. At 804, speech recognition is performed on the feature vectors. At 806, an iteration confusability metric is output for that particular iteration step. At 808, the system checks to determine if the iteration process is done. If not, flow is to 810 to perturb the feature vectors in the spatial domain. Flow is then back to 804 to process the perturbed vectors through the recognizer. Eventually, the iterative processing is done, and flow is from 808 to 812 to aggregate the iteration confusability metrics into the overall confusability metric, and output the overall confusability metric for other purposes.

It is to be understood that the method of FIG. 7 and FIG. 8 can be combined such that both temporal and spatial processing can be employed in a single iteration.

Figure 9:
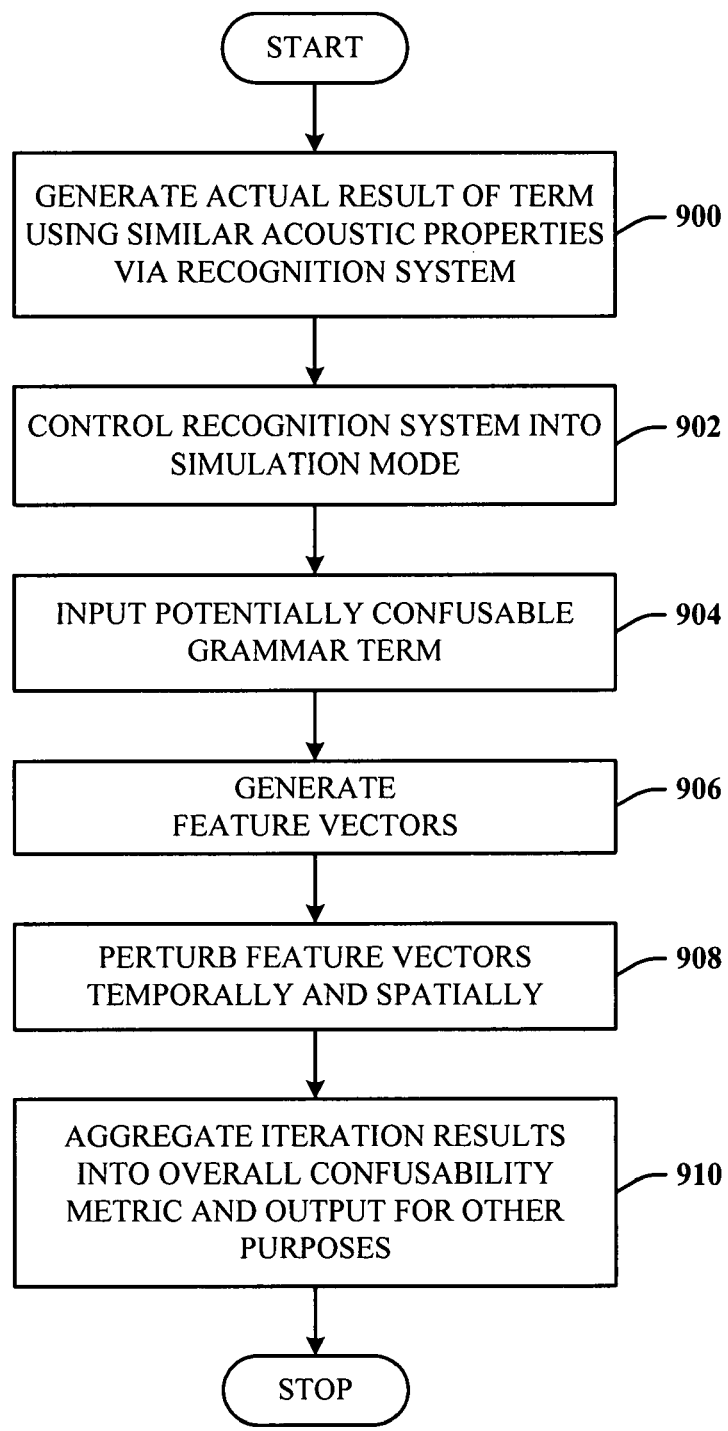
FIG. 9 illustrates a method of utilizing a speech recognition system for simulation processing.

FIG. 9 illustrates a method of utilizing a speech recognition system for simulation processing. At 900, an actual result of a term using similar acoustic properties is generated using the speech recognition system. At 902, the recognition system is controlled into a simulation mode. At 904, a potentially confusable term is selected from the application grammar, and input. At 906, feature vectors are generated. At 908, the feature vectors are perturbed temporally and spatially. At 910, the iteration results are aggregated to generate and output the overall confusability metric for other purposes.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
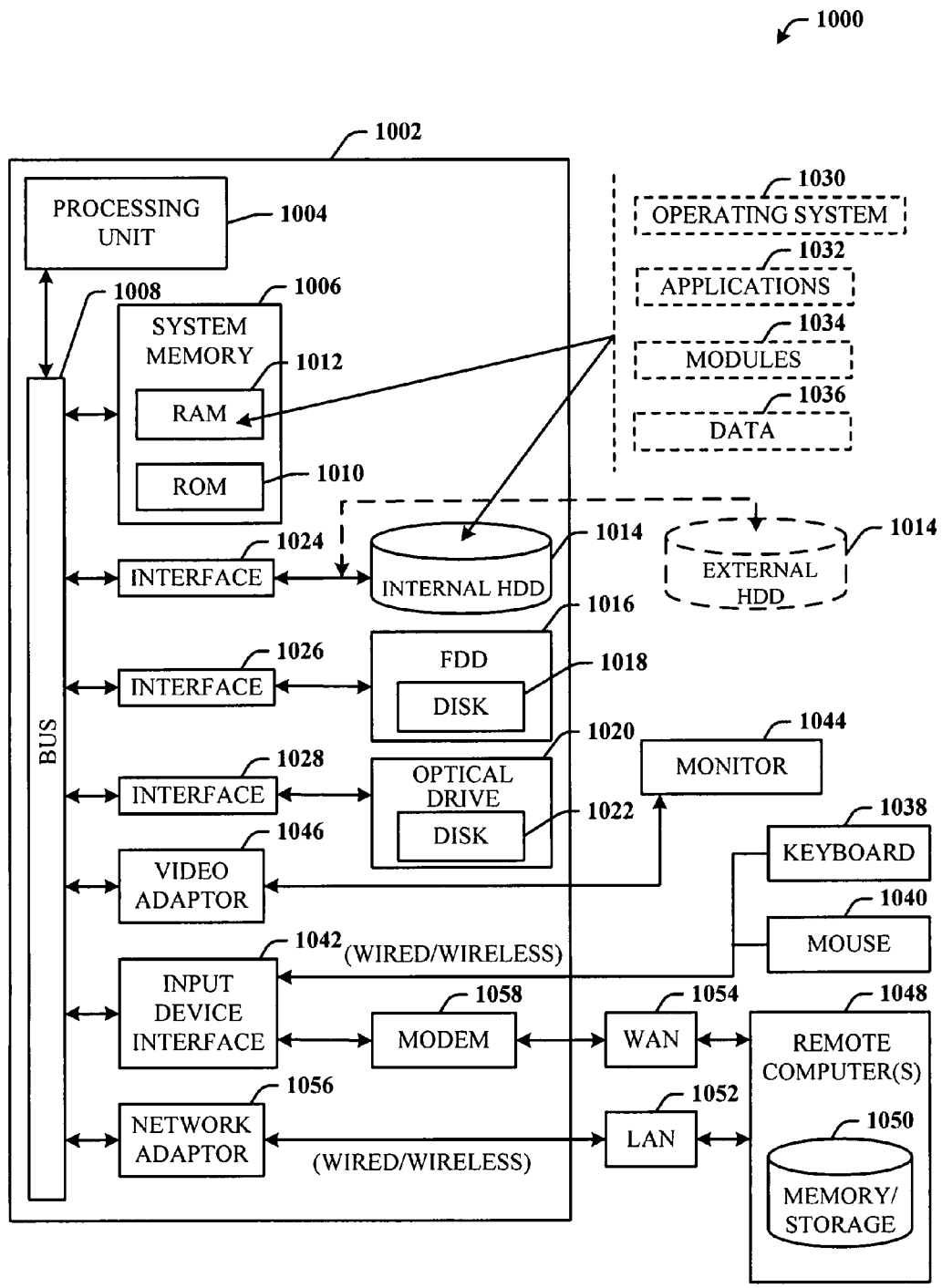
FIG. 10 illustrates a block diagram of a computing system operable to execute recognition processing for output of a confusability metric in accordance with the disclosed architecture.

Referring now to FIG. 10, there is illustrated a block diagram of a computing system 1000 operable to execute recognition processing for output of a confusability metric in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that the novel embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed architecture can be implemented with various commercially available operating systems or combinations of operating systems.

The modules 1034 and/or applications 1032 can include the vector component 102, metric component 104, aggregation component 106, simulation component 302, speech recognizer 304, interface 308, and application 306. The program data 1036 can include the grammar 202, for example.

A user can enter commands and information into the computer 1002 through one or more wired/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 11:
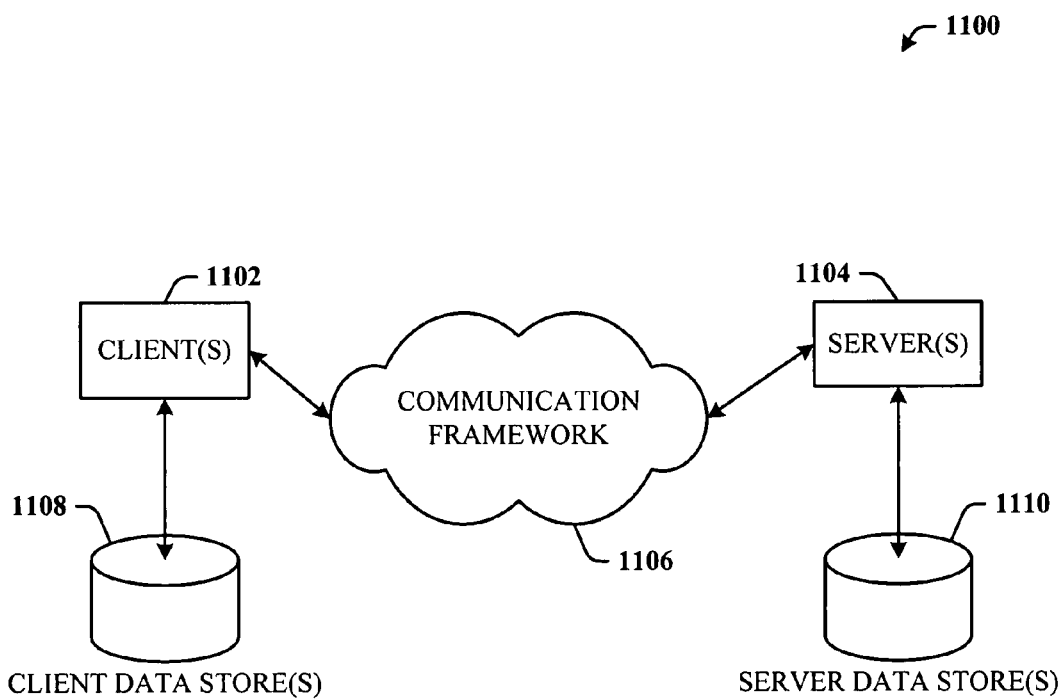
FIG. 11 illustrates a schematic block diagram of an exemplary computing environment that can execute recognition processing for output of a confusability metric.

Referring now to FIG. 11, there is illustrated a schematic block diagram of an exemplary computing environment 1100 that can execute recognition processing for output of a confusability metric. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The servers 1104 can include a web-based speech server that employs the confusability metric processing capabilities described herein. One of the clients 1102 can include the grammar 202 that is being tested by the speech server. Other implementations are within contemplation when employed in a client/server regime. For example, the metric processing capabilities can be hosted solely on one of the clients 1102 and/or solely on one of the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates speech recognition, comprising:
   a vector component for generating feature vectors that approximate acoustical properties of an input term;
   a metric component for recognition processing of the feature vectors based on multiple iterations and generating multiple iteration confusability metrics respectively for each of the multiple iterations; and
   an aggregation component for aggregating the multiple iteration confusability metrics and generating an overall confusability metric based on the multiple iterations of recognition processing of the feature vectors.

2. The system of claim 1, wherein the aggregation component is part of the metric component.

3. The system of claim 1, wherein the metric component employs a Gaussian mixture model and hidden Markov model for processing of distributions associated with the feature vectors.

4. The system of claim 1, wherein the feature vectors include a senone that is perturbed according to a Gaussian mixture model.

5. The system of claim 1, wherein the feature vectors are perturbed in a time domain for variation of time duration of the input phrase.

6. The system of claim 1, wherein the feature vectors are perturbed in a spatial domain to find neighboring phonemes.

7. The system of claim 1, wherein the term is from an application grammar that is being tested for confusability of grammar terms.

8. The system of claim 1, further comprising a simulation component for initiating simulation processing of the feature vectors based on spatial and temporal domain perturbation.

9. The system of claim 1, further comprising an application interface for triggering an end simulation event and notifying an application that the overall confusability metric can be retrieved.

10. A computer-implemented method of performing speech recognition employing a computer programmed to perform the method, comprising:
    converting an input term into a set of senone IDs;
    randomly selecting feature vectors that are representative of distributions of the set of senone IDs;
    driving a recognition process using the feature vectors to output a result;

perturbing the feature vectors in at least one of spatially or temporally for neighboring samples; and aggregating results from multiple iterations of the input term into an overall confusability metric.

11. The method of claim 10, further comprising increasing a number of the iterations based on an increase in potential confusability of the input text.

12. The method of claim 10, further comprising processing a greater number of perturbations based on an increase in potential confusability of the input text.

13. The method of claim 10, further comprising running a first process for homophones and a second process based on the first process being non-homophonic.

14. The method of claim 10, further comprising iteratively processing homophonic terms against a variable set of different pronunciations and non-homophonic terms against a fixed set of iterations.

15. The method of claim 10, further comprising perturbing the feature vectors both spatially and temporally for neighboring samples.

16. The method of claim 10, further comprising selecting the input term from an application grammar and editing the grammar based on the overall confusability metric.

17. The method of claim 10, further comprising controlling the recognition process into a simulation mode for simulation processing of feature vectors associated with a potentially confusing input term.

18. The method of claim 10, further comprising walking a tree of candidate senone IDs and perturbing the associated distributions at a mean and according to a variance about the mean.

19. A computer-implemented system, comprising:
   computer-implemented means for converting an input term into a set of senone IDs;
   computer-implemented means for randomly selecting feature vectors that are representative of distributions of the set of senone IDs;
   computer-implemented means for driving a recognition process using the feature vectors to output a result;
   computer-implemented means for perturbing the feature vectors in at least one of spatially or temporally for neighboring samples; and
   computer-implemented means for aggregating results from multiple iterations of the input term into an overall confusability metric.

* * * * *